United States Patent
Ikeno et al.

(10) Patent No.: US 9,359,013 B2
(45) Date of Patent: Jun. 7, 2016

(54) RESIN VEHICLE PART AND METHOD FOR MANUFACTURING SAME

(71) Applicant: TOYOTA SHATAI KABUSHIKI KAISHA, Kariya-shi, Aichi (JP)

(72) Inventors: Katsuya Ikeno, Kariya (JP); Tomohiro Arakawa, Nagoya (JP); Nobuyoshi Nishikawa, Obu (JP); Wataru Iwase, Nishio (JP)

(73) Assignee: TOYOTA SHATAI KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/412,382

(22) PCT Filed: Mar. 10, 2014

(86) PCT No.: PCT/JP2014/056105
§ 371 (c)(1),
(2) Date: Dec. 31, 2014

(87) PCT Pub. No.: WO2014/174921
PCT Pub. Date: Oct. 30, 2014

(65) Prior Publication Data
US 2016/0031491 A1 Feb. 4, 2016

(30) Foreign Application Priority Data

Apr. 22, 2013 (JP) .................................. 2013-089302

(51) Int. Cl.
*B60R 13/04* (2006.01)
*B62D 29/04* (2006.01)
(Continued)

(52) U.S. Cl.
CPC ............ *B62D 29/04* (2013.01); *B29C 45/0025* (2013.01); *B29C 45/0046* (2013.01);
(Continued)

(58) Field of Classification Search
CPC ............ B29C 66/71; B29C 2045/0093; B29C 65/1635; B29C 45/0025; B29C 45/1704; B29C 45/0046; B29L 2031/747; B29L 2031/30; Y10T 428/24479
USPC .................................... 296/191, 146.6, 181.2
See application file for complete search history.

(56) References Cited

U.S. PATENT DOCUMENTS 4,937,032 A * 6/1990 Krone ..................... B29C 70/08
156/242
5,225,135 A * 7/1993 Kia ....................... B29C 43/021
156/62.2

(Continued)

FOREIGN PATENT DOCUMENTS

JP     A-11-77767     3/1999
JP     A-11-309757     11/1999

(Continued)

OTHER PUBLICATIONS

Jun. 17, 2014 International Search Report issued in International Patent Application No. PCT/JP2014/056105.

*Primary Examiner* — Kiran B Patel
(74) *Attorney, Agent, or Firm* — Oliff PLC

(57) ABSTRACT

A resin part for a vehicle provided with: a panel body having a design surface; and stepped reinforcing ribs, which are vertically arranged on the inside surface of the panel body, in which the wall thickness of the base end portion is formed to be thinner than the wall thickness of the leading end portion, and in which the side ends at the end in the direction in which the ribs extend (arrow (X) direction) are open. Resin supply ports, to which molten resin is supplied prior to the base end portion, are formed in the leading end portion.

13 Claims, 11 Drawing Sheets

(51) Int. Cl.
  *B29C 45/00*  (2006.01)
  *B29C 45/14*  (2006.01)
  *B29C 45/37*  (2006.01)
  *B62D 25/02*  (2006.01)
  *B29K 101/00*  (2006.01)
  *B29L 31/30*  (2006.01)

(52) U.S. Cl.
  CPC ............... *B29C45/14* (2013.01); *B29C 45/376* (2013.01); *B62D 25/02* (2013.01); *B29C 45/37* (2013.01); *B29C 2045/0043* (2013.01); *B29K 2101/00* (2013.01); *B29L 2031/3005* (2013.01)

(56) References Cited

U.S. PATENT DOCUMENTS

| | | | | |
|---|---|---|---|---|
| 5,236,687 A | * | 8/1993 | Fukuda | B29C 70/14 423/447.2 |
| 5,356,588 A | * | 10/1994 | Hara | B29C 45/14786 264/257 |
| 5,433,478 A | * | 7/1995 | Naruse | B60R 21/0428 280/751 |
| 5,626,305 A | * | 5/1997 | Hashizume | G11B 23/08757 242/345.3 |
| 6,321,495 B1 | * | 11/2001 | Oami | B60J 1/10 296/191 |
| 6,340,186 B2 | * | 1/2002 | Johnson | 293/102 |
| 6,619,764 B2 | * | 9/2003 | Sugamura | H04N 5/64 312/7.2 |
| 6,998,089 B2 | * | 2/2006 | Osaki | B29C 33/3842 249/134 |
| 2002/0030057 A1 | * | 3/2002 | Schafer | B65D 1/22 220/600 |
| 2002/0037389 A1 | * | 3/2002 | Miyano | B29C 45/4407 428/99 |
| 2002/0139081 A1 | * | 10/2002 | Nada | B60R 13/04 52/716.5 |
| 2003/0127764 A1 | * | 7/2003 | Moriguchi | B29C 44/38 264/54 |
| 2005/0057124 A1 | * | 3/2005 | Maruta | H04N 5/64 312/7.2 |
| 2005/0229522 A1 | * | 10/2005 | Kobayashi | B29C 43/02 52/459 |
| 2006/0222841 A1 | * | 10/2006 | Masumizu | B29C 45/14336 428/319.3 |
| 2008/0290314 A1 | * | 11/2008 | Lee | C03C 8/24 252/62.3 V |
| 2009/0267369 A1 | * | 10/2009 | Hasegawa | B60R 19/18 293/132 |
| 2015/0306791 A1 | * | 10/2015 | Ikeno | B29C 45/37 428/156 |

FOREIGN PATENT DOCUMENTS

| | | |
|---|---|---|
| JP | A-2003-154541 | 5/2003 |
| JP | A-2009-29252 | 2/2009 |
| JP | A-2012-192715 | 10/2012 |

* cited by examiner

US 9,359,013 B2

RESIN VEHICLE PART AND METHOD FOR MANUFACTURING SAME

CROSS-REFERENCE TO RELATED APPLICATIONS

This is a U.S. national phase application based on the PCT International Patent Application No. PCT/JP2014/056105 filed on Mar. 10, 2014, and claiming the priority of Japanese Patent Application No. 2013-089302 filed on Apr. 22, 2013, the entire contents of which are herewith incorporated by reference.

TECHNICAL FIELD

The present invention relates to a resin part for vehicle (a resin vehicle part) configured such that a reinforcing rib is provided standing on an inner surface of a panel body having a design surface, and a method for manufacturing the resin vehicle part. In particular, the present invention relates to a resin vehicle part configured such that a reinforcing rib is formed so that a wall thickness of a base end portion is thinner than a wall thickness of a leading end portion, and a method for manufacturing the resin vehicle part.

BACKGROUND ART

In resin vehicle parts each configured such that a reinforcing rib is provided standing on an inner surface of a panel body having a design surface, generally, a portion provided with the reinforcing rib vertically standing tends to have a high heat capacity per unit area. Accordingly, there is a problem that sink is liable to occur in an outer surface of the portion provided with the standing reinforcing rib in the panel body in association with thermal shrinkage or contraction of molten resin (hereinafter, also referred to as "resin shrinkage") during injection molding. Therefore, study has been made on a structure that the wall thickness of a base end portion of the reinforcing rib is made thin to reduce the heat capacity and thereby reduce the sink and also the wall thickness of a leading end portion of the reinforcing rib is made thick to enhance the rigidity of the resin vehicle part.

For instance, Patent Document 1 discloses a resin exterior part for vehicle including a main body (corresponding to a panel body) forming the surface of a vehicle and a reinforcing rib extending in a planar direction on a back surface of the main body and protruding for reinforcing the main body. In this resin exterior part, the reinforcing rib is provided with a hollowed section in a base end portion corresponding to a root of the rib, thereby reducing the wall thickness thereof, and the reinforcing rib has an inclined shape inclining in a rib extending direction. According to this resin exterior part for vehicle, even when the hollowed portion is provided in the reinforcing rib to prevent the occurrence of sink in the outer surface of the main body, the reinforcing rib having the inclined shape oblique with respect to the rib extending direction can be prevented from falling, so that the rigidity of the resin exterior part for vehicle can be ensured.

Furthermore, Patent Document 2 discloses a molding method of an injection molded part in which a reinforcing rib is formed inside a corner section defined by two intersecting surfaces of a product. In this method, the wall thickness of the reinforcing rib is set thin to control a flow velocity of resin allowed to flow in the reinforcing rib, so that weld lines are not generated in a visible surface of the product.

RELATED ART DOCUMENTS

Patent Documents

Patent Document 1: JP-A-2009-29252
Patent Document 2: JP-A-11-77767 (1999)

SUMMARY OF INVENTION

Problems to be Solved by the Invention

However, the techniques of Patent Documents 1 and 2 have the following problems. Specifically, in the technique of Patent Document 1, when the molten resin filled in a cavity for the main body is flowing from the main body to a leading end portion of the reinforcing rib via a base end portion of the same, the molten resin becomes slow in flow velocity in the hollowed portion having a thin wall thickness. Thus, the timing of filling the leading end portion having a thick wall thickness is slow. Since the leading end portion has a large volume and hence a high heat capacity, the solidification timing of the molten resin filled in the leading end portion is later than the solidification timing of the molten resin in the main body, causing a problem that a pulling force (tensile force) generated by resin shrinkage in the leading end portion increases sink in the main body.

In the technique of Patent Document 2, one product surface is joined to a thin-walled portion of the reinforcing rib having a thin wall thickness, whereas the other product surface intersecting the one surface is joined to both a thick-walled portion of the reinforcing rib having a thick wall thickness and the thin-walled portion having the thin wall thickness. Accordingly, the pulling force generated by resin shrinkage of the thick-walled portion directly acts on the other product surface. This likely causes a problem that sink occurs in the other product surface joined to the thick-walled portion of the reinforcing rib.

In the technique of Patent Document 2, furthermore, the reinforcing rib is supported by two product surfaces at the corner section, so that the reinforcing rib is hard to warp in a direction perpendicular to the rib extending direction when an injection molded part is released, or demolded, after injection molding. Therefore, when a die is opened after injection molding to demold the injection molded part, the reinforcing rib interferes with a slide piece for forming the thin-walled portion, causing a problem with sink or distortion in the outer surface of the main body, unless a complicated die structure is adopted in which for example a slide piece is slid in a lateral direction intersecting a die opening direction or in an inclination direction.

The present invention has been made to solve the above problems and has a purpose to provide a resin vehicle part capable of reducing sink or the like in a panel body by a simple structure or method, thereby achieving thin wall thickness and high rigidity of the panel body and a reinforcing rib, and a method for manufacturing the resin vehicle part.

Means of Solving the Problems (1) To achieve the above purpose, one aspect of the invention provides a resin vehicle part including a panel body having a design surface and a stepped reinforcing rib provided standing on an inner surface of the panel body, the rib being formed such that a base end portion is thinner in wall thickness than a leading end portion and a side end at an end in a rib extending direction is open, wherein the leading end portion is formed with a resin supply port through which molten resin is supplied to the leading end portion before the base end portion.

(2) In the resin vehicle part as described in (1), preferably, a resin supply channel communicated with the resin supply port is formed along the stepped reinforcing rib in a rib height direction from the inner surface of the panel body to a lower end of the leading end portion.

(3) In the resin vehicle part as described in (2), preferably, the resin supply channel is formed by a partially thick-walled portion of the base end portion in the rib extending direction of the stepped reinforcing rib and formed to extend in the rib height direction.

(4) In the resin vehicle part as described in (2) or (3), preferably, the resin supply channel has a front-to-back width and a right-to-left width each set to be on the order of 1.5 to 2.5 times larger than a wall thickness of a root side of the base end portion.

(5) In the resin vehicle part as described in any one of (2) to (4), preferably, the resin supply channel includes resin supply channels arranged intermittently in the rib extending direction of the stepped reinforcing rib.

(6) In the resin vehicle part as described in any one of (1) to (5), preferably, the lower end of the leading end portion is formed in a tapered shape having a wall thickness gradually decreasing toward the base end portion.

(7) In the resin vehicle part as described in any one of (1) to (6), preferably, the base end portion is formed in a tapered shape having a wall thickness gradually decreasing from the lower end of the leading end portion so that the wall thickness of the root side joined to the panel body is minimum.

(8) In the resin vehicle part as described in any one of (1) to (7), preferably, the root side of the base end portion is formed with gusset ribs joined to the panel body, the gusset ribs being arranged intermittently in the rib extending direction of the stepped reinforcing rib.

(9) In the resin vehicle part as described in any one of (1) to (8), preferably, the stepped reinforcing rib includes a plurality of stepped reinforcing ribs provided to extend in approximately parallel with each other and at a distance from each other.

(10) To achieve the above purpose, another aspect of the present invention provides a method for manufacturing a vehicle resin part as described in any one of (1) to (9), wherein the method includes supplying molten resin to the leading end portion before the base end portion.

(11) In the method for manufacturing the resin vehicle part as described in (10), preferably, an injection molding die for the resin vehicle part includes a slide piece for forming a negative angle portion having an undercut shape in a die opening direction in the stepped reinforcing rib, and the slide piece is movable in a direction to come close to the panel body in accordance with resin shrinkage in a rib height direction of the stepped reinforcing rib.

(12) In the method for manufacturing the resin vehicle part as described in (11), preferably, the slide piece is coupled to a lifting plate of a lifting device provided in the injection molding die through an elastic body, the lifting plate being configured to be moved up and down in a die opening direction.

(13) In the method for manufacturing the resin vehicle part as described in (12), preferably, the elastic body urges the slide piece in a direction to come close to the lifting plate.

Effects of the Invention

According to the invention, it is possible to provide a resin vehicle part capable of reducing sink or the like in a panel body by a simple die structure, thereby achieving thin wall thickness and high rigidity of the panel body and a reinforcing rib, and a method for manufacturing the resin vehicle part.

MODE FOR CARRYING OUT THE INVENTION

A detailed description of a preferred embodiment of a resin vehicle part and a method for manufacturing the same according to the present invention will now be given referring to the accompanying drawings. A structure of the resin vehicle part in the embodiment according to the present invention will be first explained and subsequently a stepped reinforcing rib and a resin flowing operation in a resin supply channel will be explained. Further, a structure of a resin molding die for forming the present resin vehicle part and an operation of a slide piece will be explained. Finally, modified examples and others of the resin supply channel will be described.

<Structure of Resin Vehicle Part>

Figure 1:
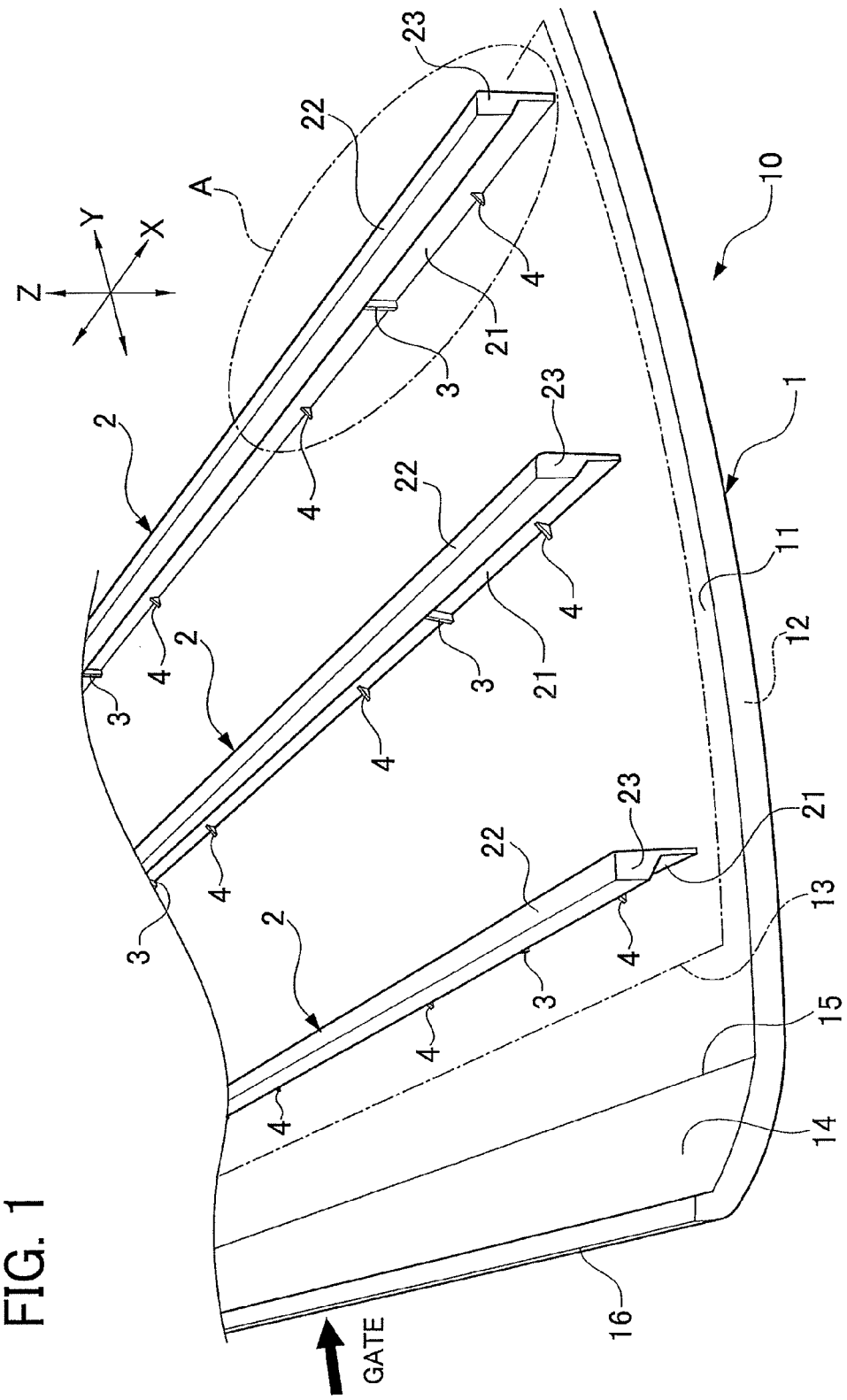
FIG. 1 is a partial perspective view of a resin vehicle part in an embodiment according to the invention.
Figure 2:
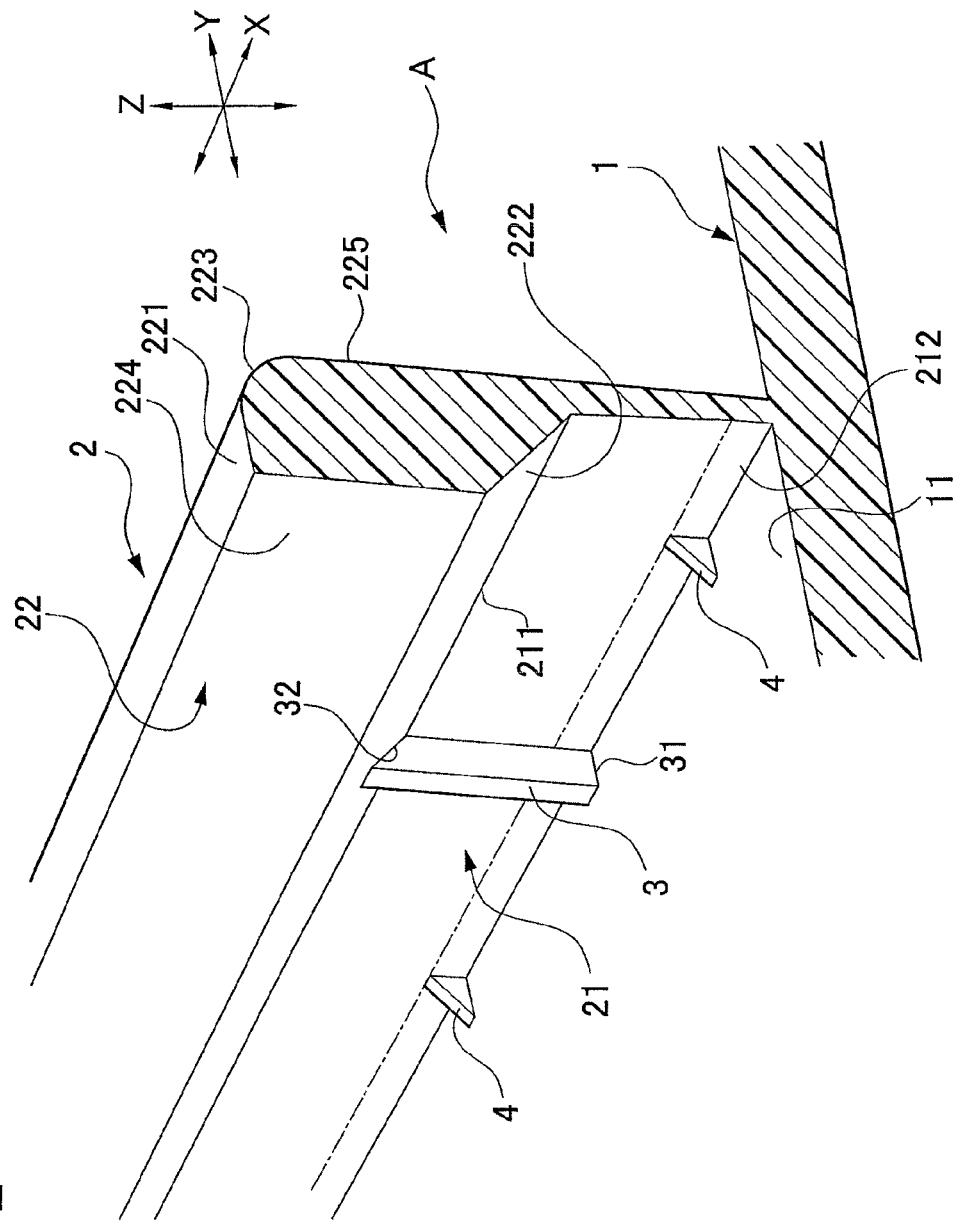
FIG. 2 is a detailed perspective view of a part A of the resin vehicle part shown in FIG. 1.
Figure 3:
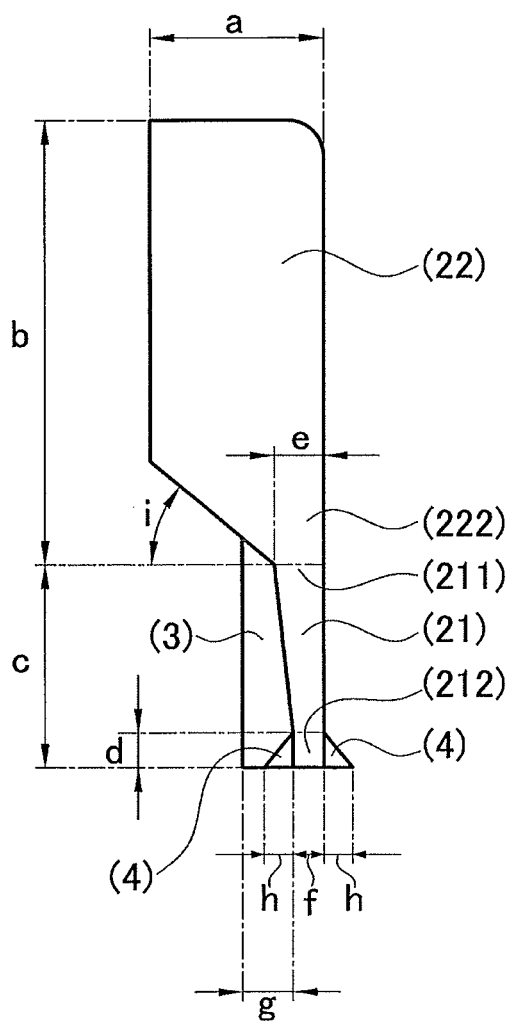
FIG. 3 is a side view of a stepped reinforcing rib and a resin supply channel shown in FIG. 2.

Firstly, the structure of the resin vehicle part in the embodiment of the present invention will be explained referring to FIGS. 1 to 3. FIG. 1 is a partial perspective view of the resin vehicle part in the embodiment of the present invention. FIG. 2 is a detailed perspective view of a part A of the resin vehicle part shown in FIG. 1. FIG. 3 is a side view of a stepped reinforcing rib and a resin supply channel shown in FIG. 2.

As shown in FIGS. 1 and 2, a resin vehicle part 10 includes a panel body 1, stepped reinforcing ribs 2, resin supply channels 3, and gusset ribs 4. The panel body 1 is a thin-walled plate-like part (a wall thickness of about 2 mm) including a design surface consisting of a normal portion 13 having a relatively small sectional curvature, a curved portion 14 having a relatively large sectional curvature, and ridge portions 15 and 16. The ridge portions 15 and 16 correspond to a character line (15) on design and a parting line (16) of a part edge, and others. In the parting line (16), a gate is provided for supplying molten resin into a cavity of a molding die.

On an inner surface 11 of the normal portion 13 of the panel body 1, a plurality of stepped reinforcing ribs 2 are provided in an upright or standing manner, each rib 2 having one side surface 224 formed in an undercut shape. Each of the stepped reinforcing ribs 2 is a stepwise reinforcing rib formed such that a base end portion 21 joined to the internal surface 11 of the panel body 1 is thinner in wall thickness than a leading end portion 22. The sectional shape of each rib 2 is almost constant in a rib extending direction (an arrow-X direction). A side end 23 at an end of each rib 2 in the extending direction (the arrow-X direction) is open, or apparent, near the boundary with the normal portion 13 in the panel body 1. Each side end 23 is formed intersecting substantially perpendicularly with the inner surface 11 of the panel body 1. The plurality of stepped reinforcing ribs 2 are provided to extend in parallel with and at a distance or interval from each other. The interval between the ribs 2 is increased or decreased according to the sectional curvature of the normal portion 13 which the ribs 2 are provided standing on. As the sectional curvature of the normal portion 13 is relatively small, the interval between the ribs 2 is set to be narrow. As the sectional curvature of the normal portion 13 is relatively large, on the other hand, the interval between the ribs 2 is set to be wide. When the sectional curvature of the normal portion 13 is almost constant, every interval between the ribs 2 is set to be approximately equal. It is to be noted that the stepped reinforcing ribs 2 are each formed in a nearly linear shape in the rib extending direction (the arrow-X direction); however, they could be greatly curved along the ridge portion 15 of the panel body 1.

As shown in FIGS. 2 and 3, the base end portion 21 is formed so that a wall thickness f on a root side 212 is minimum (very thin) by a predetermined height d and a wall thickness e on an upper end side 211 continuous to a lower end 222 of the leading end portion 22 is slightly thicker than the wall thickness f of the root side 212. For instance, preferably, the wall thickness f of the root side 212 is on the order of 0.3 to 0.4 mm and the wall thickness e on the upper end side 211 is on the order of 0.41 to 0.6 mm. At that time the height c of the base end portion is on the order of 3.0 mm and the height d of the root side 212 is on the order of 0.5 mm.

The lower end 222 of the leading end portion 22 is formed in a tapered shape having a wall thickness gradually decreasing toward the base end portion 21. An inclination angle i of the tapered lower end 222 with respect to a horizontal direction is preferably on the order of 45°. Preferably, the leading end portion 22 is designed such that a wall thickness a is set to be thick when a height b is low, whereas the wall thickness a is set to be thin when the height b is high, in order to enhance rigidity in the rib extending direction while ensuring weight reduction. For instance, the wall thickness a is set on the order of 2.0 mm for the height b of about 5.0 mm. The wall thickness a is set on the order of 3.0 mm for the height b of about 3.0 mm.

An upper end 221 of the leading end portion 22 is formed in approximately parallel with the inner surface 11 of the panel body 1. A curved surface is formed at a corner portion 223 defined by intersecting the upper end 221 of the leading end portion 22 and the other side surface 225 opposite the one side surface 224 formed in an undercut shape. The corner portion 223 formed as the curved surface enables guiding molten resin supplied from the resin supply channel 3 to the leading end portion 22 to flow along the second side surface 224 toward the base end portion 21. At the lower end 222 of the leading end portion 22, a resin supply port 32 is formed to supply the molten resin to the leading end portion 22 via the resin supply channel 3 mentioned later.

As shown in FIGS. 1 and 2, each resin supply channel 3 is a runner for allowing molten resin supplied into a mold cavity for the panel body 1 via a gate to flow in the leading end portion 22 of the stepped reinforcing rib 2 prior to flowing in the base end portion 21. The resin supply channel 3 is formed to protrude forward in a flow of the molten resin flowing in the cavity for the panel body via the gate. The resin supply channel 3 is formed along the base end portion 21 from a junction 31 with the inner surface 11 of the panel body 1 to the lower end 222 of the leading end portion 22 of the stepped reinforcing rib 2 and communicates with the resin supply port 32. The resin supply channels 3 are formed by partially thick-walled portions of each base end portion 21 on an undercut side and formed to extend in a height direction (an arrow-Z direction). The resin supply channels 3 are arranged at predetermined intervals in the rib extending direction (the arrow-X direction) and warpable together with the stepped reinforcing rib 2 in a direction (an arrow-Y direction) perpendicular to the rib extending direction during demolding after injection molding.

A front-to-back width g (see FIG. 3) of the resin supply channel 3 in the direction (the arrow-Y direction) perpendicular to the rib extending direction is set according to a flow amount of the molten resin supplied to the leading end portion 22 to flow in the rib extending direction (the arrow-X direction). The flow amount is preferred to allow the molten resin supplied through the resin supply channel 3 to be supplied nearly uniformly throughout the leading end portion 22 in the rib extending direction (the arrow-X direction). To be concrete, the front-to-back width g of the resin supply channel 3 is preferably on the order of 1.5 to 2.5 times larger than the wall thickness f of the root side 212 of the base end portion 21. For example, for about 0.3 to 0.4 mm of the wall thickness f of the root side 212 of the base end portion 21, the front-to-back width g of the resin supply channel 3 is preferably on the order of 0.5 to 0.7 mm. A right-to-left width of the resin supply channel 3 in the rib extending direction (the arrow-X direction) is nearly equal to the front-to-back width g.

As shown in FIGS. 1, 2, and 3, the gusset ribs 4 are triangular reinforcing ribs connecting the root side 212 of the base end portion 21 and the inner surface 11 of the panel body 1. These gusset ribs 4 are formed at predetermined intervals in the rib extending direction (the arrow-X direction). Each of the gusset ribs 4 has a wall thickness nearly equal to or less than the wall thickness f of the root side 212 of the base end portion 21. The gusset ribs 4 are preferably designed with a shape that reduces the heat capacity of the root side 212 of the base end portion 21 in order to obscure the sink generated in the outer surface 12 of the panel body 1. For instance, the shape of each gusset rib 4 is determined so that the length h of a bottom side of a triangular shape defining of each gusset rib 4 is nearly equal to or less than the height d of the root side 212 of the base end portion 21 and an oblique side is linear or curve-concave. The gusset ribs 4 are also preferably arranged at predetermined intervals from the resin supply channels 3.

The height of each gusset rib 4 is preferably set nearly equal to the height d of the root side 212 providing the minimum (very thin) wall thickness of the base end portion 21. This can reinforce only the root side 212 of the base end portion 21, which is a junction with the inner surface 11 of the panel body 1. As a result, while the gusset ribs 4 hold the corresponding stepped reinforcing rib 2 in a standing state, only an upper part of the base end portion 21 above the root side 212 can be warped or bent in a direction (the arrow-Y direction) perpendicular to the rib extending direction during demolding after injection molding. Since the stepped reinforcing ribs 2 are held in the standing state by the gusset ribs 4 even during demolding after injection molding, it is possible to reduce sink and distortion in the outer surface 12 of the panel body 1.

<Resin Flowing Operations in Stepped Reinforcing Rib and Resin Supply Channel>

Figure 4:
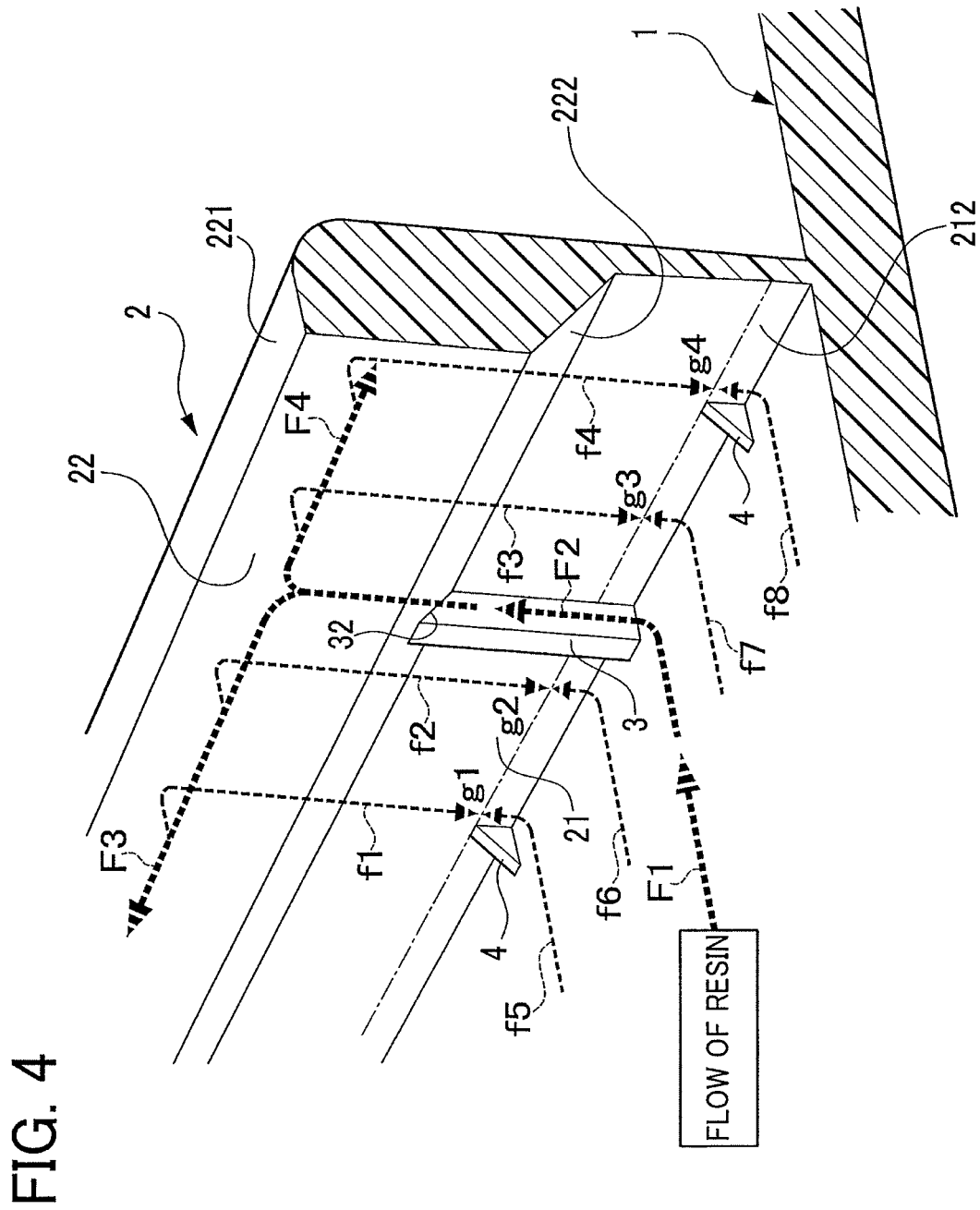
FIG. 4 is a perspective diagram schematically showing a flow of molten resin to be supplied to a stepped reinforcing rib and a resin supply channel shown in FIG. 2.

Resin flowing operations in the stepped reinforcing ribs 2 and the resin supply channels 3 will be explained below referring to FIG. 4. FIG. 4 is a perspective view schematically showing flows of molten resin to be supplied to the stepped reinforcing rib and the resin supply channel shown in FIG. 2.

As shown in FIG. 4, the molten resin flows in an arrow-F1 direction in a cavity for the panel body 1. This arrow-F1 direction is a direction perpendicular to the rib extending direction of the stepped reinforcing rib 2. The molten resin flowing in the cavity for the panel body 1 flows in an arrow-F2 direction through the resin supply channel 3 formed protruding forward in the resin flow, and then is supplied to the leading end portion 22 through the resin supply port 32 before the base end portion 21.

The molten resin supplied to the leading end portion 22 through the resin supply port 32 flows in arrow-F3 and F4 directions (the rib extending direction), filing the leading end portion 22. At that time, the molten resin can promptly and smoothly move in the arrow-F3 and F4 directions (the rib extending direction) along the tapered lower end 222. The molten resin supplied to the leading end portion 22 flows in arrow-f1 to f4 directions at different positions in the rib extending direction, and then respective resin flows almost uniformly go into the base end portion 21.

The base end portion 21 is tapered with the wall thickness gradually decreasing from the lower end 222 of the leading end portion 22 so that the wall thickness of the root side 212 joined to the panel body 1 is minimum (very thin). The molten resin flowing in the arrow-f1 to f4 directions finally reach the root side 212 having the minimum (very thin) wall thickness. On the other hand, the molten resin flowing in the panel body 1 in arrow-f5 to f8 directions (planar direction) less flows in the root side 212 formed with the minimum (very thin) wall thickness, thus providing larger flow resistance than the resin supply channel 3.

Accordingly, the flows of molten resin flowing from the leading end portion 22 in the arrow-f1 to f4 directions and reaching the root side 212 merge, in the root side 212, with the flows of molten resin flowing through the panel body 1 in the arrow-f5 to f8 directions (the planar direction), and then start to solidify. This solidification timing is later than the solidification timing of the molten resin in the leading end portion 22. Thus, the pulling force (tensile force) due to resin shrinkage in the leading end portion 22 having a large heat capacity is canceled out in the root side 212 of the base end portion 21 in which the solidification is late. This can further avoid the influence on the panel body 1 and further reduce sink in the outer surface 12 of the panel body 1.

<Structure of Resin Molding Die and Method of Operating Slide Piece>

Figure 5:
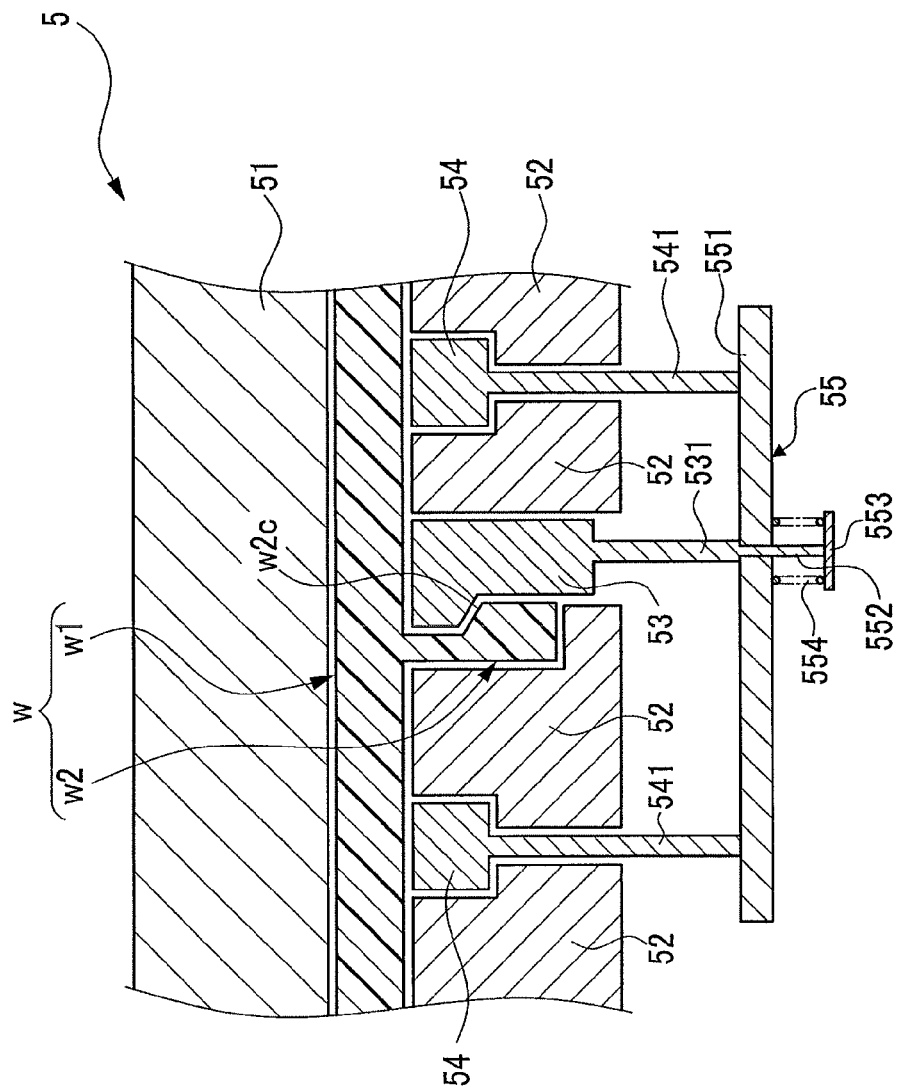
FIG. 5 is a partial sectional view of a resin molding die for forming the resin vehicle part shown in FIG. 1.
Figure 6:
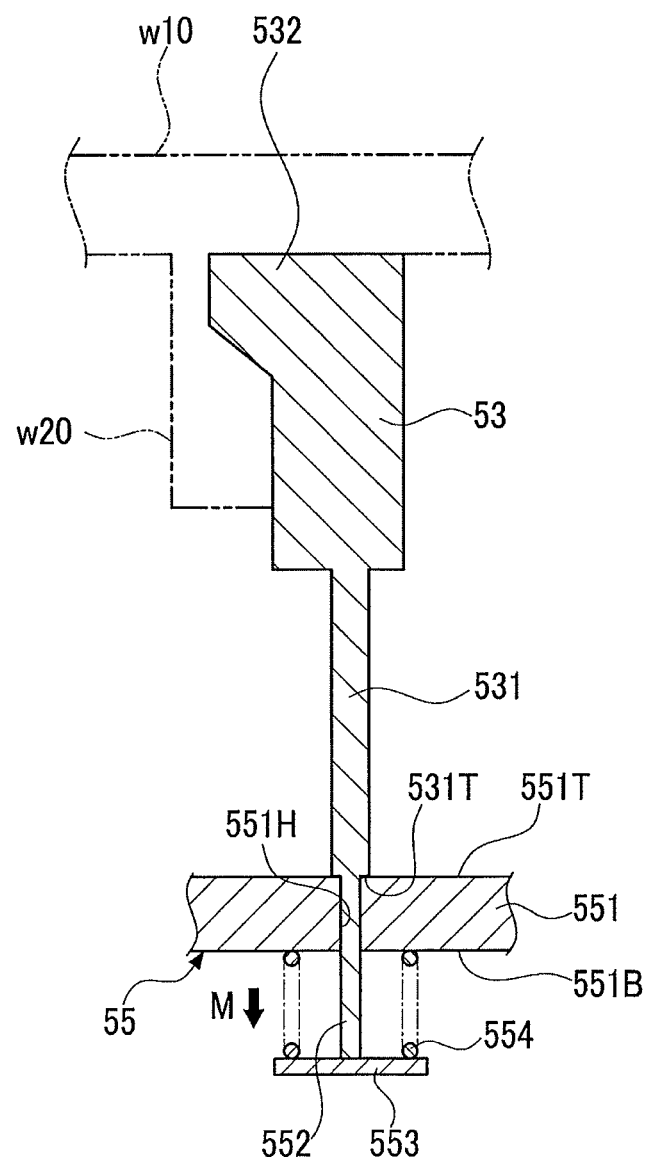
FIG. 6 is a schematic sectional view related to a slide piece in the resin molding die shown in FIG. 5.
Figure 7:
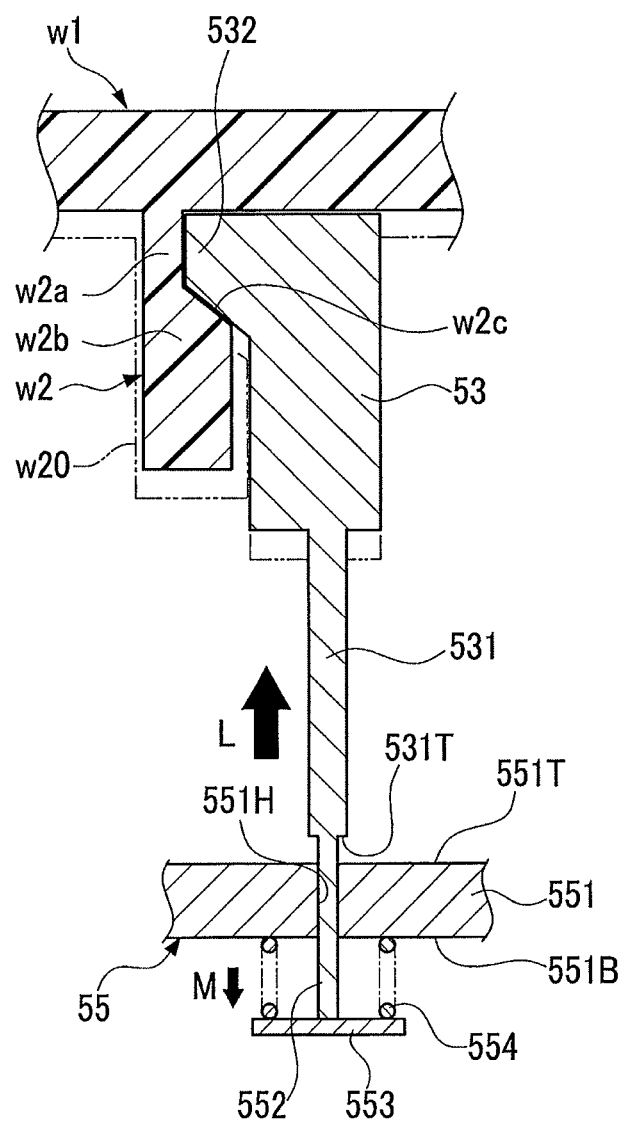
FIG. 7 is an explanatory view of operation of the slide piece shown in FIG. 6.
Figure 8:
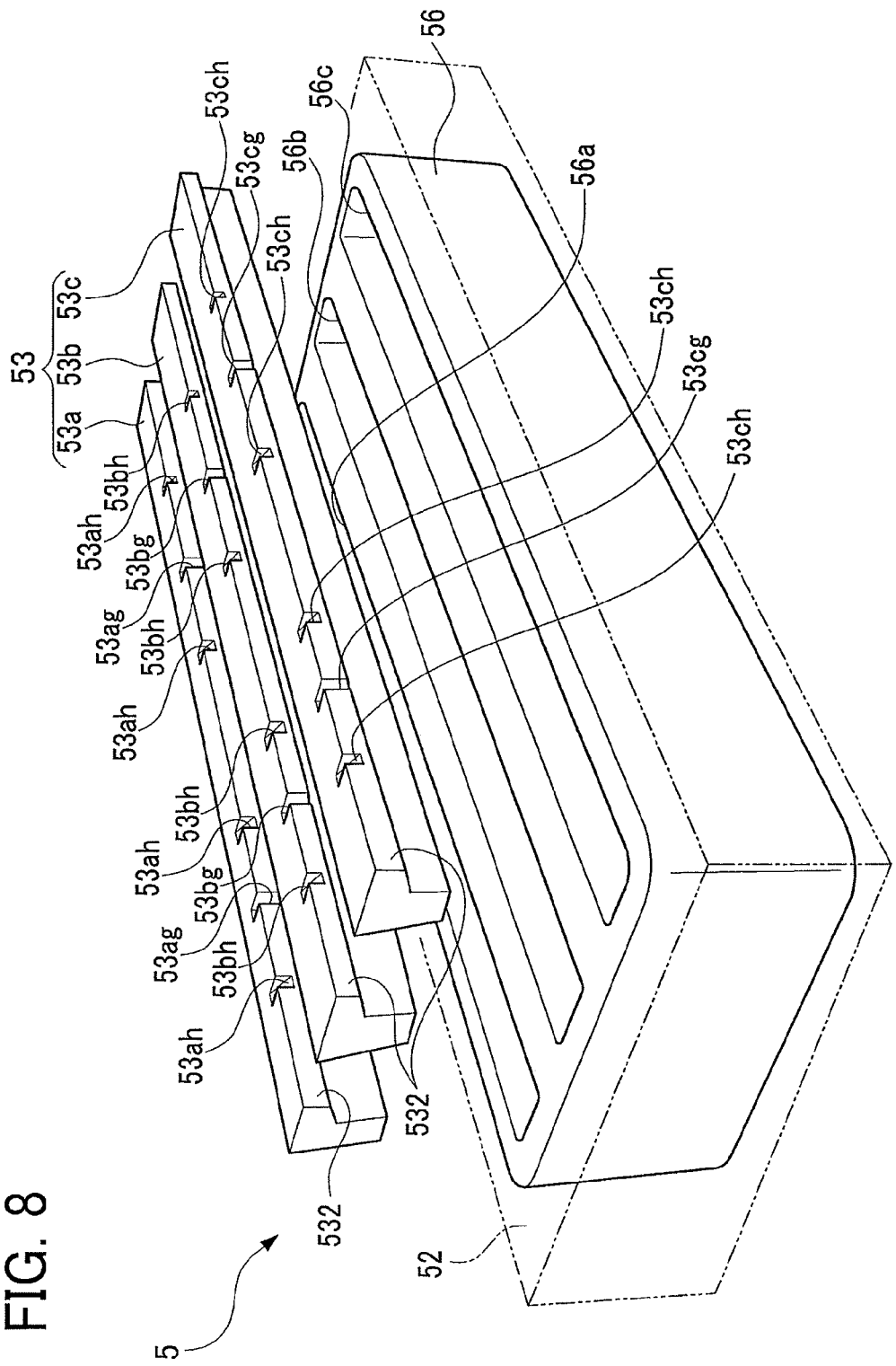
FIG. 8 is a partial perspective view showing a nesting structure of the slide piece in the resin molding die shown in FIG. 5.

A structure of a resin molding die for injection molding the resin vehicle part in the present embodiment and a method of operating a slide piece will be explained below referring to FIGS. 5 to 8. FIG. 5 is a partial sectional view of the resin molding die for forming the resin vehicle part shown in FIG. 1. FIG. 6 is a schematic sectional view related to the slide piece of the resin molding die shown in FIG. 5. FIG. 7 is an explanatory view of operation of the slide piece shown in FIG. 6. FIG. 8 is a partial perspective view showing a nesting or insert structure of the resin molding die shown in FIG. 5.

As shown in FIGS. 5 to 7, an injection molding die 5 for injection molding the resin vehicle part (an injection molded part w) includes a fixed die 51, a movable die 52, and a lifting device 55 for demolding the injection molded part w. The lifting device 55 is configured to move up and down in a direction of opening the movable die 52. The injection molded part w has a panel body w1 and stepped reinforcing ribs w2.

The movable die 52 internally contains a slide piece 53 for forming a negative angular portion w2c having an undercut shape in the die opening direction in the stepped reinforcing rib w2, and panel receiving members 54 which will contact with the inner surface of the panel body w1. The slide piece 53 is coupled to a lifting plate 551 of the lifting device 55 through a spring member 554 (an elastic body). At a lower end of the slide piece 53, a first connecting member 531 is formed. A lower end of the first connecting member 531 is connected with a spring receiving member 553 with a connecting pin 552. A lower end 531T of the first connecting member 531 abuts on an upper end 551T of the lifting plate 551. The connecting pin 552 is fixed to the lower end 531T of the first connecting member 531 and protrudes down from a through hole 551H penetrating the lifting plate 551. A lower end of the connecting pin 552 is connected to the spring receiving member 553. The spring member 554 is held under pressure between a lower end 551B of the lifting plate 551 and the spring receiving member 553. A lower end of the panel receiving member 54 is formed with a second connecting member 541. This second connecting member 541 is fixed to the lifting plate 551.

When the lifting plate 551 of the lifting device 55 is moved up in the die opening direction, the slide piece 53 and the panel receiving members 54 are simultaneously moved up. Simultaneous upward movement of the slide piece 53 and the panel receiving members 54 causes the injection molded part w to be demolded without deformation from the movable die 52. Herein, after the injection molded part w is moved up to a position where the stepped reinforcing ribs w2 go out of the cavity of the movable die 52, a carrier device not shown carries and delivers the injection-molded part w in a direction (e.g., obliquely upward) away from the slide piece 53, thereby avoiding interference between a leading end portion w2b of the stepped reinforcing rib w2 and a protrusion 532 of the slide piece 53. Accordingly, the injection-molded part w can be readily demolded without sliding the slide piece 53 in a lateral direction intersecting with the die opening direction or in an oblique direction.

As shown in FIGS. 6 and 7, furthermore, the slide piece 53 is connected with the lifting plate 551 of the lifting device 55 through the spring member 554 urging the slide piece 53 in an arrow-M direction. The urging force of the spring member 554 is set sufficiently small as compared with the pulling force generated when the molten resin for the stepped reinforcing rib w2 cools and shrinks in volume. This allows the slide piece 53 to move in an arrow-L direction following the resin shrinkage of the stepped reinforcing rib w2.

Accordingly, the pulling force resulting from resin shrinkage of the stepped reinforcing rib w2 hardly acts on the outer surface of the panel body w1, so that sink that may be generated in the outer surface of the panel body w1 can be greatly reduced. Since the above pulling force also hardly acts on the base end portion w2a of the stepped reinforcing rib w2, it is possible to greatly reduce a possibility of breaking the base end portion w2a of the stepped reinforcing rib w2, even when the thickness thereof is designed to be thin.

The spring member 554 urges the slide piece 53 in the direction (the arrow-M direction) to come close to the lifting plate 551. Accordingly, while the molten resin is being injected in a cavity w10 for the panel body w1, the slide piece 53 does not protrude into the cavity w10 for the panel body w1.

The lower end 531T of the first connecting member 531 formed at the lower end of the slide piece 53 is in contact with the upper end 551T of the lifting plate 551. Accordingly, while the molten resin is being injected in the cavity w10 for the panel body w1, the slide piece 53 does not move downward nor expand the cavity w10 for the panel body w1.

Therefore, the slide piece 53 does not block a flow of molten resin in the cavity w10 for the panel body w1. This can prevent the occurrence of molding defects such as welds and voids in the panel body w1.

<Nesting Structure of Slide Piece in Injection Molding Die>

A nesting or insert structure of the slide piece in the injection molding die will be explained below referring to FIG. 8. FIG. 8 is a partial perspective view showing the nesting structure of the slide piece in the resin molding die shown in FIG. 5.

As shown in FIG. 8, in the injection molding die 5, a rectangular insert 56 is inserted in the movable die 52. The insert 56 is formed with rectangular rib grooves 56a, 56b, and 56c in positions corresponding to the stepped reinforcing ribs w2. The slide pieces 53 (53a, 53b, 53c) each having a nearly L-shape in section are inserted to be movable up and down in the rib grooves 56a, 56b, and 56c. An upper end of each of the slide pieces 53 (53a, 53b, 53c) is formed with a protrusion 532 protruding in a horizontal direction. Respective gaps between the rib grooves 56a, 56b, and 56c formed in the insert 56 and the slide pieces 53a, 53b, and 53c form cavities w20 for the stepped reinforcing ribs w2 (see FIGS. 6 and 7). Accordingly, adjusting the above gaps makes it possible to easily change the wall thickness of each stepped reinforcing rib w2. In particular, it is easy to set a thin wall thickness of the base end portion w2a.

The protrusions 532 of the slide pieces 53a, 53b, and 53c are formed with vertical cavities 53ag, 53bg, and 53cg for resin supply channels at predetermined intervals. Further, the protrusions 532 of the slide pieces 53a, 53b, and 53c are formed with inclined cavities 53ah, 53bh, 53ch for gusset ribs at predetermined intervals. The cavities 53ag, 53bg, and 53cg for resin supply channels and the cavities 53ah, 53bh, 53ch for gusset ribs each have a narrow groove shape; however, they can be formed by machining the corresponding slide pieces 53a, 53b, and 53c taken out of the insert 56. This achieves high machining property. Each of the cavities for gusset ribs may also be provided in a shoulder portion formed in the rib groove 56a, 56b, 56c formed in the insert 56 in a position corresponding to a root of the base end portion w2a of the stepped reinforcing rib w2.

<Operations and Effects>

As explained in detail above, according to the resin vehicle part 10 in the embodiment of one aspect of the invention, the leading end portion 22 of each of the stepped reinforcing ribs 2 is formed with the resin supply ports 32 through which the molten resin is supplied to the leading end portion 22 prior to being supplied to the base end portion 21. Accordingly, the molten resin filled in the die cavity is supplied first to the leading end portions 22 through the resin supply ports 32 and later to the base end portions 21. Thus, the molten resin supplied to the leading end portions 22 through the resin supply ports 32 can flow from the leading end portions 22 into the base end portions 21. The molten resin for the leading end portions 22 supplied through the resin supply ports 32 first cools and solidifies and then the molten resin supplied from the leading end portions 22 to the base end portions 21 solidifies later than the leading end portions 22. In each stepped reinforcing rib 2, consequently, it is possible to greatly reduce the influence of the pulling force due to resin shrinkage in each leading end portion 22 having a large heat capacity on sink in the panel body 1.

According to the present embodiment, the resin supply channels 3 communicated with the corresponding resin supply ports 32 are formed along the rib height direction (the arrow-Z direction) of each of the stepped reinforcing ribs 2 from the inner surface 11 of the panel body 1 to the lower ends of the leading end portions 22. Accordingly, the molten resin flowing in the planar direction (the arrow-Y direction) in the panel body 1 flows through the resin supply channels 3, moving in the rib height direction (the arrow-Z direction) of each stepped reinforcing rib 2, and is supplied to the lower ends 222 of the leading end portions 22 through the resin supply ports 32. The molten resin supplied to the lower ends 222 of the leading end portions 22 is filled promptly over the entire leading end portions 22 while moving throughout the leading end portions 22 having a thick wall thickness in the rib extending direction (the arrow-X direction) of the stepped reinforcing ribs 2. Subsequently, the molten resin filled in the entire leading end portions 22 flows from the lower ends 222 of the leading end portions 22 in the rib extending direction (the arrow-X direction) of the stepped reinforcing ribs 2 toward the panel body 1 side of the base end portions 21 having a thin wall thickness. Thus, a flow circuit of molten resin to each stepped reinforcing rib 2 is formed in which the molten resin from the panel body 1 via the resin supply channels 3 first fills the entire leading end portions 22 having a thick wall thickness and later fills the entire base end portions 21 having a thin wall thickness. Accordingly, the molten resin for the leading end portions 22 filled first in terms of time starts to solidify before the molten resin for the base end portions 21 filled later. As a result, the pulling force due to thermal shrinkage of the molten resin for the leading end portions 22 having a high heat capacity is canceled out by the molten resin for the base end portions 21 having not solidified yet. This can substantially avoid the pulling force from influencing the panel body 1.

According to the present embodiment, the resin supply channels 3 are formed by partially thick-walled portions of the base end portion 21 in the rib extending direction (the arrow-X direction) of the stepped reinforcing rib 2 and formed to extend in the rib height direction. Accordingly, the flowability of molten resin in the rib height direction in the portions of each base end portion 21 formed with the resin supply channels 3 is enhanced more than the flowability of molten resin in the rib height direction of other portions of each base end portion 21 not formed with the resin supply channels 3. Therefore, the molten resin flowing in the planar direction (the arrow-Y direction) in the panel body 1 can be supplied to the leading end portions 22 through the portions of each base end portion 21 formed with the resin supply channels 3 prior to being supplied to the portions of each base end portion 21 not formed with the resin supply channels 3. Each resin supply channel 3 is formed by simply making the wall thickness of the corresponding base end portions 21 partially thick in the rib extending direction (the arrow-X direction) of each stepped reinforcing rib 2. Thus, the resin supply channels 3 less influence the heat capacity of the entire stepped reinforcing ribs 2. Consequently, in the outer surface 12 of a portion of the panel body 1 on which the resin supply channels 3 are vertically provided, sink less occurs due to thermal shrinkage of molten resin during injection molding. Furthermore, even if sink occurs, it is partial in the rib extending direction (the arrow-X direction) and thus it is not noticeable for a person who observes visual quality of the design surface.

According to the present embodiment, the resin supply channels 3 are arranged intermittently in the rib extending direction (the arrow-X direction) of each stepped reinforcing rib 2. Accordingly, the resin supply channels 3 can be easily warped together with the corresponding stepped reinforcing ribs 2 in the direction (the arrow-Y direction) perpendicular to the rib extending direction during demolding after injection molding. Therefore, even without adopting any complicated die structure in which for example the slide pieces 53 for forming the negative angle portions 2c of the stepped reinforcing ribs w2 are slid in a lateral direction intersecting the die opening direction or in an inclination direction, it is possible to prevent a possibility that sink and distortion occurs in the panel body 1 under the influence of the resin supply channels 3 during demolding after injection molding.

Further, according to the present embodiment, the lower ends 222 of the leading end portions 22 are each formed in a tapered shape having a wall thickness gradually decreasing toward the corresponding base end portions 21. Accordingly, the molten resin supplied to the leading end portions 22 is allowed to promptly and smoothly flow in the rib extending direction (the arrow-X direction) along the lower ends 222 of the tapered leading end portions 22. Each of the lower ends 222 of the leading end portions 22 serve as a flow channel for allowing the molten resin supplied to the leading end portions 22 to flow in the rib extending direction (the arrow-X direction). Therefore, the molten resin supplied to the leading end portions 22 is allowed to flow almost uniformly in different positions of each base end portion 21 in the rib extending direction (the arrow-X direction). This can almost uniformly reduce the sink in the outer surface 12 of the panel body 1 even in any portion of the stepped reinforcing ribs 2 in the rib extending direction (the arrow-X direction). It is to be noted that the inclination angle i of the taper shape of the lower end 222 of each leading end portion 22 is on the order of 45°, so that the molten resin is allowed to more promptly and smoothly in the rib extending direction (the arrow-X direction) along the lower ends 222 of the tapered leading end portions 22.

According to the present embodiment, each of the base end portions 21 is formed in a tapered shape having a wall thickness gradually decreasing from the lower ends 222 of the leading end portions 22 so that the wall thickness f of the root sides 212 joined to the panel body 1 is minimum (very thin). Accordingly, the molten resin flowing from the leading end portions 22 toward the base end portions 21 finally reaches the root sides 212 having the minimum (very thin) wall thickness. The molten resin reaching each of the root sides 212 merges with the molten resin flowing in the planar direction (the direction (the arrow-Y direction) perpendicular to the rib extending direction) in the panel body 1 and starts to solidify. This solidification timing is later than the solidification timing of the molten resin for each of the leading end portions 22. Thus, the pulling force (tensile force) generated by resin shrinkage in the leading end portions 22 having a high heat capacity is canceled out by the molten resin for the root sides 212 having not solidified yet. This can further avoid the influence of the pulling force on the panel body 1, thereby further enabling reducing the sink in the outer surface 12 of the panel body 1.

According to the present embodiment, each of the root sides 212 of the base end portions 21 is formed with the gusset ribs 4 joined to the panel body 1, the gusset ribs 4 being arranged intermittently in the rib extending direction (the arrow-X direction) of each stepped reinforcing rib 2. Accordingly, each of the root sides 212 of the base end portions 21 is partially reinforced by the gusset ribs 4 and thus the rigidity of each stepped reinforcing rib 2 is enhanced. Therefore, even if the external force acts on the resin vehicle part 10, the outer surface 12 of the panel body 1 is less distorted or deformed. It is to be noted that only a portion above each of the root sides 212 of the base end portions 21 can be warped by an amount corresponding to interference with a die for forming the negative angle portion w2c in the direction (the arrow-Y direction) perpendicular to the rib extending direction while the gusset ribs 4 hold the standing state of each of the root sides 212 of the base end portions 21 even during demolding after injection molding. This can substantially maintain the standing state of each stepped reinforcing rib 2 by the gusset ribs 4, thereby enabling reducing the sink and distortion in the outer surface 12 of the panel body 1.

According to the present embodiment, furthermore, the stepped reinforcing ribs 2 are provided to extend in approximately parallel with each other and at a distance from each other. Accordingly, it is possible to effectively reinforce the region of the panel body 1, the region including the curved surface of a small sectional curvature and a relatively small surface rigidity, while reducing the sink or the like of the panel body 1. Specifically, the panel body 1 of the resin vehicle part 10 is generally composed of combinations of the ridge portions 15 and the normal portions 13 formed between the ridge portions 15 in order to provide both visual design quality of a design surface and panel rigidity. The sectional curvature near each ridge portion 15 is normally larger than the sectional curvature of each normal portion 13 formed between the ridge portions. Thus, the vicinity of each ridge portion 15 is a region having high surface rigidity and is easily formed with a thin wall thickness. On the other hand, each of the ridge portions 15 and each of the normal portions 13 formed between the ridge portions 15 is a region having a relatively small sectional curvature and low surface rigidity. These regions need the reinforcing rib or ribs to enhance the surface rigidity. In the present embodiment, the stepped reinforcing ribs 2 are provided to extend in approximately parallel with and at a distance from each other in the regions corresponding to the normal portions 13 relatively low in surface rigidity as compared with the vicinity of the ridge portions 15. This makes it possible to achieve both thin wall thickness and high rigidity of the panel body 1 and the stepped reinforcing ribs 2 while reducing the sink or the like in the panel body 1 due to resin shrinkage of the stepped reinforcing ribs 2.

According to the method for manufacturing the resin vehicle part in the present embodiment of another aspect of the invention, the molten resin is supplied to the leading end portions 22 of the stepped reinforcing ribs 2 before the base end portions 21. Accordingly, the molten resin filled in the cavity of the die is supplied to the leading end portions 22 first and then to the base end portions 21 later. Thus, the molten resin supplied to the leading end portions 22 can flow from the leading end portions 22 toward the base end portions 21. Thus, the molten resin supplied first to the leading end portions 22 first cools and solidifies, and thereafter the molten resin supplied from the leading end portions 22 to the base end portions 21 solidifies later than the leading end portions 22. Consequently, the pulling force due to resin shrinkage in the leading end portions 22 having a high heat capacity is canceled out by the molten resin for the base end portions 21 having not completely solidified yet, thereby enabling greatly reducing the influence of sink on the panel body 1.

According to the present embodiment of the above aspect, the injection molding die 5 of the resin vehicle part 10 includes the slide pieces 53 for forming the negative angle portions w2c each having an undercut shape in the die opening direction in the stepped reinforcing ribs w2. The slide pieces 53 are movable in the direction to come close to the panel body w1 in accordance with resin shrinkage of the stepped reinforcing ribs w2 in the rib height direction. Accordingly, when the molten resin filled in the cavity of the die cools and thermally shrinks in volume, the leading end portions w2b of the stepped reinforcing ribs w2 will come into contact with the protrusions 532 of the slide pieces 53 for forming the negative angle portions w2c of the stepped reinforcing ribs w2 and cause the slide pieces 53 to move in the direction to come close to the panel body w1.

Therefore, the pulling force due to resin shrinkage in the rib height direction of each stepped reinforcing rib does not act on the outer surface of the panel body w1. It is thus possible to greatly reduce the sink in the outer surface of the panel body w1. Furthermore, the pulling force also does not act on the base end portion w2a of each stepped reinforcing rib w2. This enables greatly reducing a possibility of fracture or breakage of the base end portions w2a of the stepped reinforcing ribs w2 even when the base end portions w2a are designed with a thinner wall thickness. Even if a weld line is generated in the base end portions w2a of the stepped reinforcing ribs w2 due to the merging of the molten resin from the panel body w1 and the molten resin from the leading end portions w2b, the slide pieces 53 movable in the direction to come close to the panel body 1 according to resin shrinkage of the stepped reinforcing ribs w2 in the rib height direction can reduce a possibility that causes a crack or cracks in the weld line.

According to the above aspect, the slide pieces 53 are coupled to the lifting plate 551 configured to move up and down in the die opening direction of the lifting device 55 provided in the injection molding die 5. Accordingly, at the same time when the lifting plate 551 of the lifting device 55 moves up, the slide pieces 53 also move up, making the stepped reinforcing ribs w2 go out of the cavity of the die. This can easily demold the injection molded part w. Further, the slide pieces 53 are coupled to the lifting plate 551 of the lifting device 55 through the elastic bodies 554. Accordingly, the slide pieces 53 can move following the shrinkage action of the stepped reinforcing ribs w2 in the rib height direction. Herein, the elastic bodies 554 may be a spring member or a gas member. The elastic bodies 554 urge the slide pieces 53 in the direction to come close to the lifting plate 551. Thus, when the molten resin is injected into the cavity for the panel body w1, the slide pieces 53 do not protrude into the cavity for the panel body w1. Therefore, the slide pieces 53 do not block a flow of molten resin in the cavity for the panel body w1. This can prevent the occurrence of molding defects such as weld lines and voids in the panel body w1.

The present invention may be embodied in other specific forms as below without departing from the essential characteristics thereof.

(1) In the above embodiment, the resin supply ports 32 are formed in the lower end 222 of the leading end portion 22 and the resin supply channels 3 communicated with the resin supply ports 32 are formed along the rib height direction (the arrow-Z direction) from the inner surface 11 of the panel body 1 to the lower end 222 of the leading end portion 22. However, the invention is not necessarily limited thereto.

Figure 9:
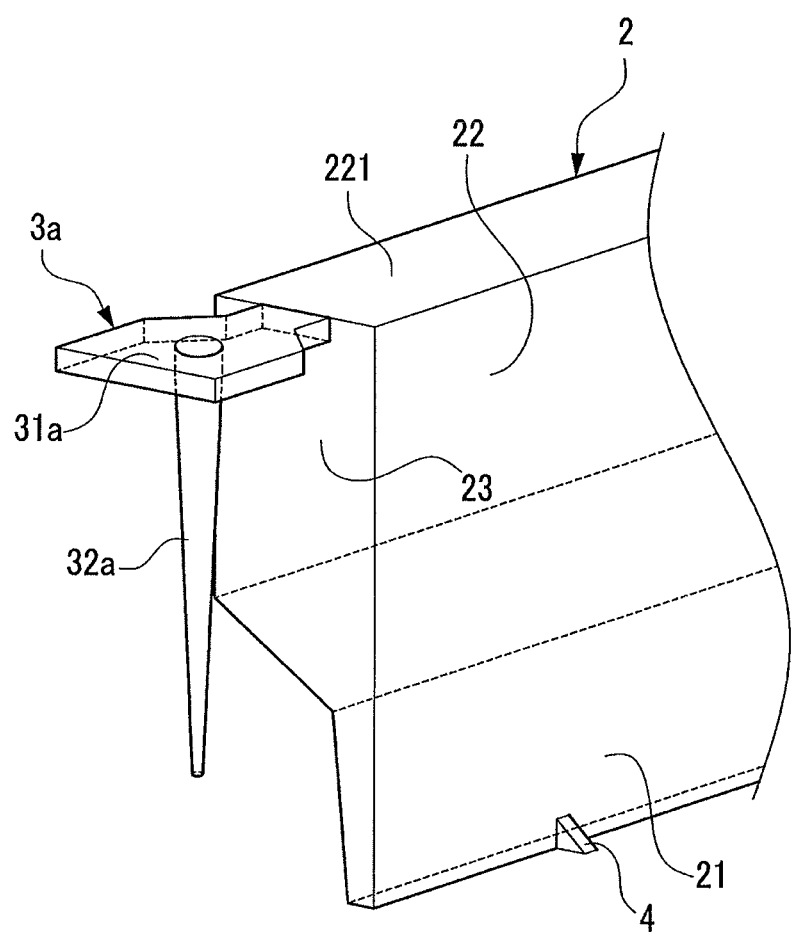
FIG. 9 is a partial perspective view of a first modified example of the resin supply channel shown in FIG. 1.

For example, as shown in FIG. 9, a side gate 3a may be provided on a side end 23 at an end of the stepped reinforcing rib 2 in the rib extending direction (the arrow-X direction) in order to form a resin supply port in the leading end portion 22. In this case, a runner 31a and a sprue 32a which constitute a resin supply channel are cut off after molding.

Figure 10:
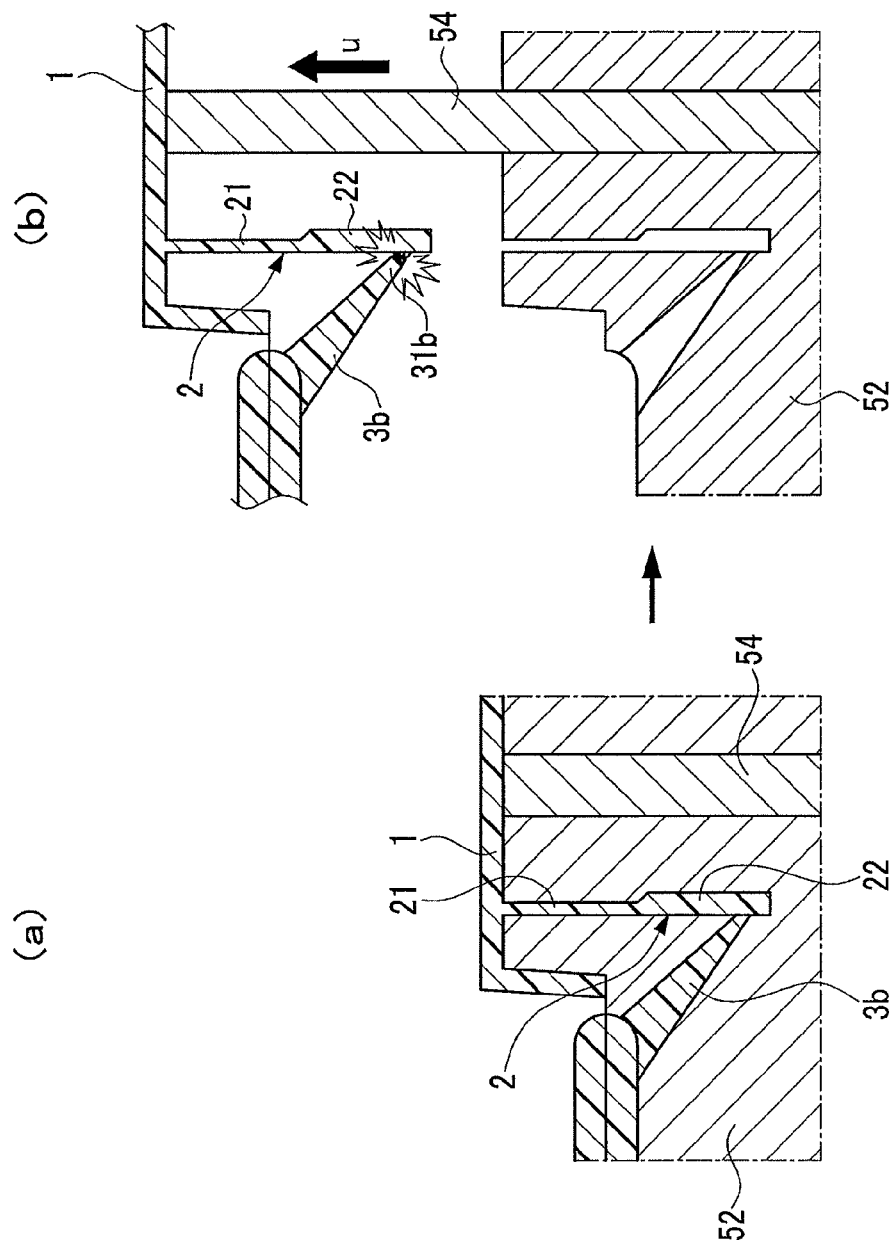
FIG. 10 is a partial perspective view of a second modified example of the resin supply channel shown in FIG. 1.

As another example, as shown in FIG. 10, a submarine gate 3b may be provided to form a resin supply port in a side surface of the leading end portion 22 of the stepped reinforcing rib 2. When the panel receiving member 54 of the lifting device moves upward in an arrow-u direction, a connecting portion 31b of the submarine gate 3b is separated from the leading end portion 22.

Figure 11:
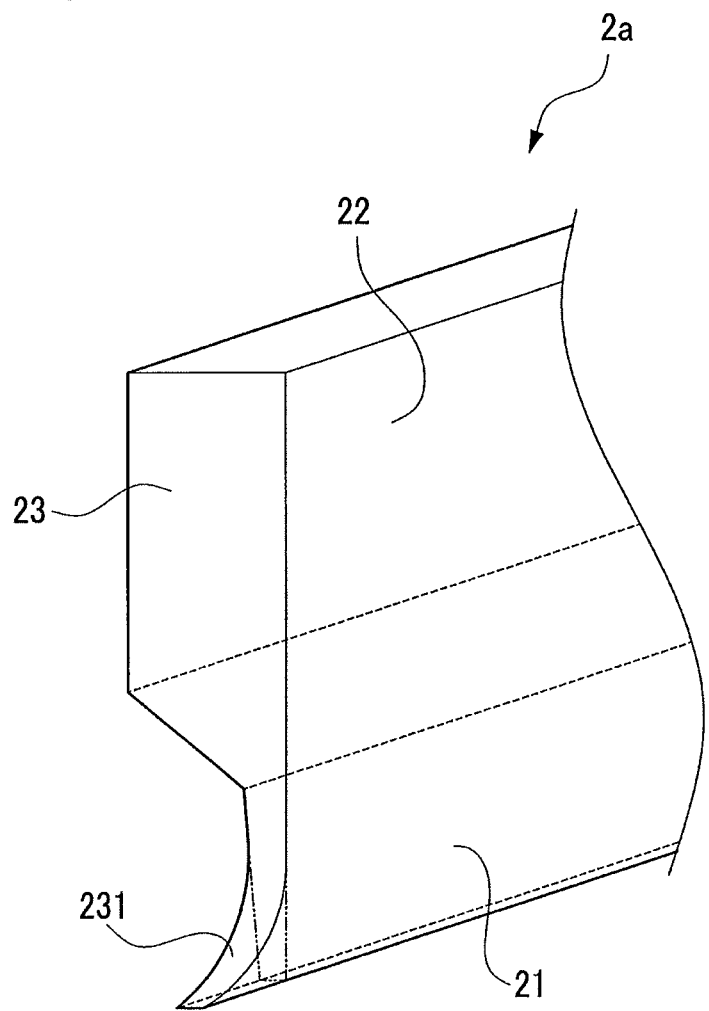
FIG. 11 is a partial perspective view of a modified example of a stepped reinforcing rib shown in FIG. 1.

(2) In the above embodiment, the side end 23 at the end of the stepped reinforcing rib 2 in the rib extending direction (the arrow-X direction) is formed intersecting at an almost right angle with the inner surface 11 of the panel body 1. As an alternative, an inclined gradual changing portion 231 may be added as shown in FIG. 11. This gradual changing portion 231 can avoid rapid change in heat capacity in the side end 23 and thus reduce the sink in the outer surface 12 of the panel body 1.

INDUSTRIAL APPLICABILITY

The present invention can be utilized to the resin vehicle part in which a reinforcing rib is provided standing on an inner surface of a panel body having a design surface and the method for manufacturing the resin vehicle part and particularly utilized to the resin vehicle part in which the wall thickness of a base end portion of the reinforcing rib is made thinner than the wall thickness of a leading end portion and the method for manufacturing the resin vehicle part.

REFERENCE SIGNS LIST

1 Panel body
2 Stepped reinforcing rib
3 Resin supply channel
4 Gusset rib
5 Resin molding die
10 Resin vehicle part
11 Inner surface
12 Outer surface
13 Normal portion
14 Curved portion
15 Ridge portion (Character line)
16 Ridge portion (Parting line)
21 Base end portion
22 Leading end portion
23 Side end portion
32 Resin supply port
51 Fixed die
52 Movable die
53 Slide piece
55 Lifting device
212 Root side
w Injection molded part
w1 Panel body
w2 Stepped reinforcing rib
w2a Base end portion
w2b Leading end portion
w2c Negative angle portion

The invention claimed is:

1. A resin vehicle part including a panel body having a design surface and a stepped reinforcing rib provided standing on an inner surface of the panel body, the rib being formed such that a base end portion is thinner in wall thickness than a leading end portion and a side end at an end in a rib extending direction is open,
wherein the leading end portion is formed with a resin supply port through which molten resin is supplied to the leading end portion before the base end portion.

2. The resin vehicle part according to claim 1, wherein a resin supply channel communicated with the resin supply port is formed along the stepped reinforcing rib in a rib height direction from the inner surface of the panel body to a lower end of the leading end portion.

3. The resin vehicle part according to claim 2, wherein the resin supply channel is formed by a partially thick-walled portion of the base end portion in the rib extending direction of the stepped reinforcing rib and formed to extend in the rib height direction.

4. The resin vehicle part according to claim 2, wherein the resin supply channel has a front-to-back width and a right-to-left width each set to be on the order of 1.5 to 2.5 times larger than a wall thickness of a root side of the base end portion.

5. The resin vehicle part according to claim 1, wherein the resin supply channel includes resin supply channels arranged intermittently in the rib extending direction of the stepped reinforcing rib.

6. The resin vehicle part according to claim 1, wherein the lower end of the leading end portion is formed in a tapered shape having a wall thickness gradually decreasing toward the base end portion.

7. The resin vehicle part according to claim 1, wherein the base end portion is formed in a tapered shape having a wall thickness gradually decreasing from the lower end of the leading end portion so that the wall thickness of the root side joined to the panel body is minimum.

8. The resin vehicle part according to claim 1, wherein the root side of the base end portion is formed with gusset ribs joined to the panel body, the gusset ribs being arranged intermittently in the rib extending direction of the stepped reinforcing rib.

9. The resin vehicle part according to claim 1, wherein the stepped reinforcing rib includes a plurality of stepped reinforcing ribs provided to extend in approximately parallel with each other and at a distance from each other.

10. A method for manufacturing a resin vehicle part according to claims 1, wherein the method includes supplying molten resin to the leading end portion before the base end portion.

11. The method for manufacturing a resin vehicle part according to claim 10, wherein an injection molding die for the resin vehicle part includes a slide piece for forming a negative angle portion having an undercut shape in a die opening direction in the stepped reinforcing rib, and the slide piece is movable in a direction to come close to the panel body in accordance with resin shrinkage in a rib height direction of the stepped reinforcing rib.

12. The method for manufacturing a resin vehicle part according to claim 11, wherein the slide piece is coupled to a lifting plate of a lifting device provided in the injection molding die through an elastic body, the lifting plate being configured to be moved up and down in a die opening direction.

13. The method for manufacturing a resin vehicle part according to claim 12, wherein the elastic body urges the slide piece in a direction to come close to the lifting plate.

* * * * *